United States Patent
Doud

[19]

[11] Patent Number: 5,822,430

[45] Date of Patent: Oct. 13, 1998

[54] SYSTEM FOR ENCODING ENCRYPTION/ DECRYPTION INFORMATION INTO IFF CHALLENGES

[75] Inventor: Robert Doud, Bedford, Mass.

[73] Assignee: Technical Communications Corporation, Concord, Mass.

[21] Appl. No.: 752,899

[22] Filed: Nov. 20, 1996

[51] Int. Cl.$^6$ .............................. H04K 1/02; H04K 1/04; H04L 9/00; G01S 13/78

[52] U.S. Cl. .................................. 380/9; 380/21; 342/45

[58] Field of Search ............................. 342/45, 203, 204, 342/36–40, 13, 14, 16; 380/9, 21

[56] References Cited

U.S. PATENT DOCUMENTS

| | | | |
|---|---|---|---|
| H1606 | 11/1996 | Gelnovatch | 340/505 |
| 3,860,922 | 1/1975 | Wagner | 343/6.8 LC |
| 3,900,867 | 8/1975 | Wagner | 343/6.5 R |
| 3,905,035 | 9/1975 | Krumoltz | 343/6.5 R |
| 3,922,673 | 11/1975 | Bishop | 343/6.5 R |
| 3,945,006 | 3/1976 | Cleeton | 343/6 R |
| 3,949,397 | 4/1976 | Wagner | 343/6.5 R |
| 4,077,005 | 2/1978 | Bishop | 325/32 |
| 4,383,322 | 5/1983 | Halpern | 375/1 |
| 4,434,323 | 2/1984 | Levine et al. | 380/48 |
| 4,442,430 | 4/1984 | Schneider | 343/6.5 R |
| 4,646,147 | 2/1987 | Krüger | 380/14 |
| 4,814,769 | 3/1989 | Robin | 342/45 |
| 4,862,176 | 8/1989 | Voles | 342/45 |
| 4,864,616 | 9/1989 | Pond | 380/25 |
| 4,866,773 | 9/1989 | Lubarsky | 380/48 |
| 4,937,867 | 6/1990 | Kasparian et al. | 380/35 |
| 5,001,751 | 3/1991 | Sanford | 380/23 |
| 5,014,314 | 5/1991 | Mulford et al. | 380/43 |
| 5,101,208 | 3/1992 | Parker | 342/45 |
| 5,113,444 | 5/1992 | Vobach | 380/47 |
| 5,185,796 | 2/1993 | Wilson | 380/21 |
| 5,193,115 | 3/1993 | Vobach | 380/46 |
| 5,222,137 | 6/1993 | Barrett et al. | 380/21 |
| 5,303,303 | 4/1994 | White | 380/49 |
| 5,495,533 | 2/1996 | Linehan | 380/21 |
| 5,579,008 | 11/1996 | Hulderman | 342/44 |

*Primary Examiner*—Thomas H. Tarcza
*Assistant Examiner*—Hrayr A. Sayadian
*Attorney, Agent, or Firm*—Cesari and McKenna, LLP

[57] ABSTRACT

An IFF system produces a challenge in which some or all of the anti-interference pulses that are inserted between adjacent bits of an encrypted message are replaced with "information pulses" that convey information which a decryption sub-system uses to decipher the encrypted message. To produce an information pulse that replaces a given anti-interference pulse, the system combines an information bit with the anti-interference pulse. The decryption sub-system recovers the information bit from the information pulse by comparing the state of that pulse with the state of the anti-interference pulse that it replaced. If the states of the two pulses are the same, the information bit is a zero and if the states differ, the information bit is a one. The information included in the information pulses may be, for example, an address that the decryption sub-system uses to select a cryptographic key from one or more stored tables of keys. Alternatively, or in addition, the information pulses may include the time associated with the encryption of the message, which the decryption sub-system uses to update a sub-system clock.

29 Claims, 6 Drawing Sheets

SYSTEM FOR ENCODING ENCRYPTION/DECRYPTION INFORMATION INTO IFF CHALLENGES

FIELD OF THE INVENTION

This invention relates generally to cryptographic systems and more specifically to identify friend or foe ("IFF") systems.

BACKGROUND OF THE INVENTION

The identify friend or foe ("IFF") system that is in use today was developed in the late 1950s to enable defensive radar systems to inquire if a target can prove it is friendly. The IFF system broadcasts an encrypted inquiry, or "pings" the target with a "challenge," and requests that the target send back a response that is specific to the challenge. If the target correctly responds to the challenge within a predetermined time, the IFF system determines that the target is a friend. Otherwise, the IFF system determines that the target is unknown, and therefore may be unfriendly.

The challenge consists of a synchronization pattern and a 32-bit message. As discussed below, the 32 bit message, or data, bits are encrypted with a Block Cipher controlled by one of two selected cryptographic keys, in an attempt to hinder the efforts of foes to interpret and respond appropriately to the challenge within the predetermined time.

The interrogation sub-system of the IFF system consists essentially of an interrogator and an encryption crypto-computer. The encryption crypto-computer formulates and encrypts the message, and appends the encrypted message to the synchronization pattern, which consists of a series of four binary "ones" that are commonly referred to as "synchronization pulses," and an interrogator side lobe suppression pulse, "ISLS pulse," which is included for noise suppression. The interrogator then broadcasts the challenge as a series of precisely timed radar pulses. A synchronization pulse and a one in the encrypted message are transmitted, respectively, as a radar pulse at a designated time in the associated cycle of a transmit clock. A zero in the encrypted data is transmitted as the absence of a pulse at the designated time in the associated transmit clock cycle.

A transponder in the target receives and demodulates the radar pulses, using the synchronization pulses to determine the timing of the binary ones and zeros, and reproduces the challenge as a binary waveform. A decryption crypto-computer then deciphers the message included in the challenge and formulates an appropriate response. The decryption crypto-computer provides a time-encoded response which is modulated by the transponder and sent to the interrogation sub-system.

If the transponder is processing a challenge when a subsequent challenge is received, the transponder ignores the second challenge. Accordingly, a response to the second challenge is not sent back to the interrogation sub-system. The interrogation sub-system uses a ratio of valid responses to invalid or absent responses, to determine if a target is a friend or an unknown.

The IFF system designers feared that an enemy might exploit the IFF system by broadcasting false challenges, to occupy the target sub-systems and leave them no time to respond to valid challenges. For example, an enemy might broadcast the synchronization pulses and nothing more. If the decryption crypto-computer interprets the absence of radar pulses following the synchronization pulses as an all-zero challenge, the enemy could keep it busy by periodically broadcasting just the five synchronization pulses. Thus, the enemy could expend a minimal amount of energy and jam the system.

To prevent this, the IFF system includes in the challenge, between the bits of the encrypted message, a series of anti-interference interrogation ("AII") pulses. If the adjacent message bits are both zeros, the AII pulse is a one, and otherwise, the AII pulse is a zero. If the AII pulse is a one, the interrogator produces a radar pulse at a designated time following the data bit time in the transmit clock cycle, and if the AII pulse is a zero, the interrogator refrains from producing the pulse at the designated time.

If the decryption computer determines that the transponder did not receive at least one radar pulse, corresponding either to an encrypted message bit or to an AII pulse, within some number of consecutive clock cycles it rejects the challenge. The decryption crypto-computer determines that the challenge is invalid and the computer then stops processing the received signal and issues a "disparity" indication to the transponder. This frees both the transponder and the decryption crypto-computer to receive a next challenge. Consequently, the inclusion of the AII pulses forces an enemy who wants to jam the IFF system to produce the five synchronization pulses and some minimum number of associated radar pulses that the transponder will interpret as message bits and/or AII pulses. It is believed that an enemy will not want to utilize its transmitting power in this manner, and thus, that the enemy will not attempt to jam the IFF system.

The AII pulses are not encrypted, and are removed from the message by the decryption crypto-computer before the message is deciphered. The AII pulses thus do not affect the formulation of the response, which is produced by encoding the deciphered message bits.

As discussed above, at any given time one of two cryptographic keys is used to encrypt the messages, in an attempt to hinder the enemy's deciphering of the challenges. In the present system a keyfill device containing the cryptographic keys is used to load the keys into the decryption crypto-computer. Thereafter, at designated times, the transponder operator manually flips a switch on a control unit to change the key that the decryption crypto-computer then uses to decipher the challenges. If the operator's clock is not synchronized with the ground-based clock, or if the operator is otherwise engaged, the switch may not be flipped and the computer will then use the wrong key to decipher the next few challenges. The responses produced by the decryption crypto-computer are consequently incorrect and the target may be designated an unknown by the IFF system.

The 32-bit ciphered word was, in the late 1950s, of sufficient length that a contemporary processor could not exploit or crypto-analyze the message in a reasonable time. Currently, technology renders a 32-bit code somewhat vulnerable, even with the periodic exchange of the two cryptographic keys. Accordingly, the IFF system is in need of improvement.

Studies have been performed to determine how to update the IFF system and make it more secure against exploitation. To date, the suggested changes to the system require the re-design of the interrogators and the transponders, which are the most expensive components of the system. Such a re-design would require replacing the transponder in each of the hundreds or thousands of friendly vehicles, not to mention the replacement of the interrogators in the many ground-based radar installations.

SUMMARY OF THE INVENTION

The invention is a system that replaces some or all of the AII pulses in the challenge with "information pulses" that convey information which the system uses to decipher the 32-bit encrypted messages. The information encoded into the information pulses may be, for example, used to automatically select a cryptographic key from one or more stored tables of keys. This not only frees the transponder operator from manually throwing a switch that controls the selection of the key, it allows the system to use many keys and to increase the frequency with which the keys are exchanged.

Alternatively or in addition, the information pulses may convey the time associated with the encryption of the message. The time can then be used to update a real-time clock in the decryption crypto-computer, to select the appropriate key to decipher the message, and/or to prevent later "re-play" of previously sent messages, that is, a re-play of an otherwise valid challenge by an enemy in an attempt to jam the system.

Alternatively, the information pulses may instead be additional code bits that serve to lengthen the encrypted 32-bit message without altering the length or content of the overall message, as discussed in more detail below.

The system may replace particular AII pulses with the information pulses, or it may vary the positions of the information pulses within the AII pulse positions based on a cryptographic algorithm. Preferably, some of the AII pulses are not replaced, so that they can perform their original anti-interference function and prevent a false message that consists of many consecutive zeros from being interpreted as a challenge.

Since the binary waveform of the challenge is not fundamentally changed, conventional interrogators and transponders can be used to transmit and receive the challenge. Accordingly, the cost to upgrade the present system in order to utilize the AII pulses as information pulses is minimized, while the advantages are many.

DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
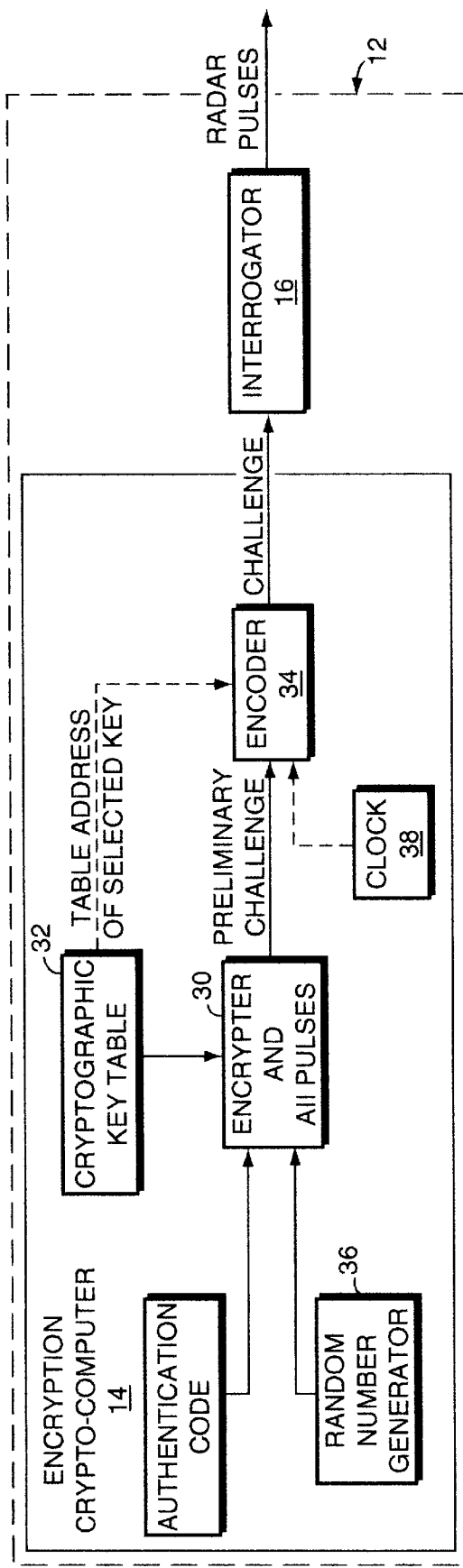
FIG. 1 is a functional block diagram of an IFF system constructed in accordance with the current invention.
Figure 1:
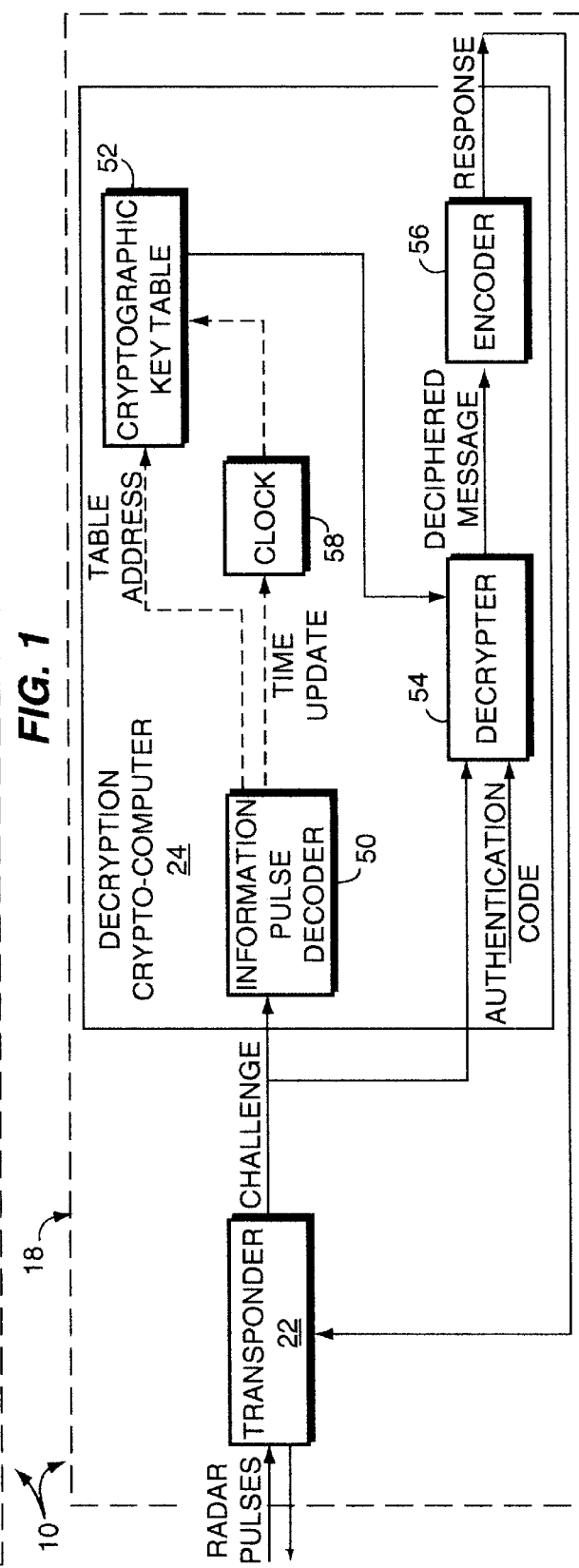

Referring now to FIG. 1, an IFF system 10 includes in an interrogation station 12 an encryption crypto-computer 14 that produces a challenge and a conventional interrogator 16 that broadcasts the challenge as a series of precisely timed radar pulses. The encryption crypto-computer 14 includes an encrypter 30 that transforms a plaintext 32-bit message into an encrypted 32-bit message in accordance with a cryptographic key that is selected from a key table 32. The encrypter 30 then forms a preliminary challenge by concatenating the encrypted message with a predetermined number of synchronization pulses and inserting the AII pulses between the bits of the encrypted message in a conventional manner. Next, the encryption crypto-computer uses an encoder 34 to encode into the AII pulses additional information that is needed to decipher the message. The result of the encoding is the challenge that is broadcast to a target by the interrogator 16. The operations of the encryption crypto-computer 14 are discussed in more detail below with reference to FIG. 2.

A target station 18 of the IFF system 10 includes a conventional transponder 22 that receives and demodulates the broadcast radar signals. The transponder 22 produces a binary waveform that represents the received challenge. A decryption crypto-computer 24 then uses the information encoded into the information pulses in the challenge to decipher the encrypted message. The decryption crypto-computer next encodes the deciphered message in an encoder 56 to produce a time-encoded response, which the transponder 22 sends back to the interrogation station 12. The operations of the decryption crypto-computer 24 are discussed in more detail below with reference to FIG. 4.

Figure 2:
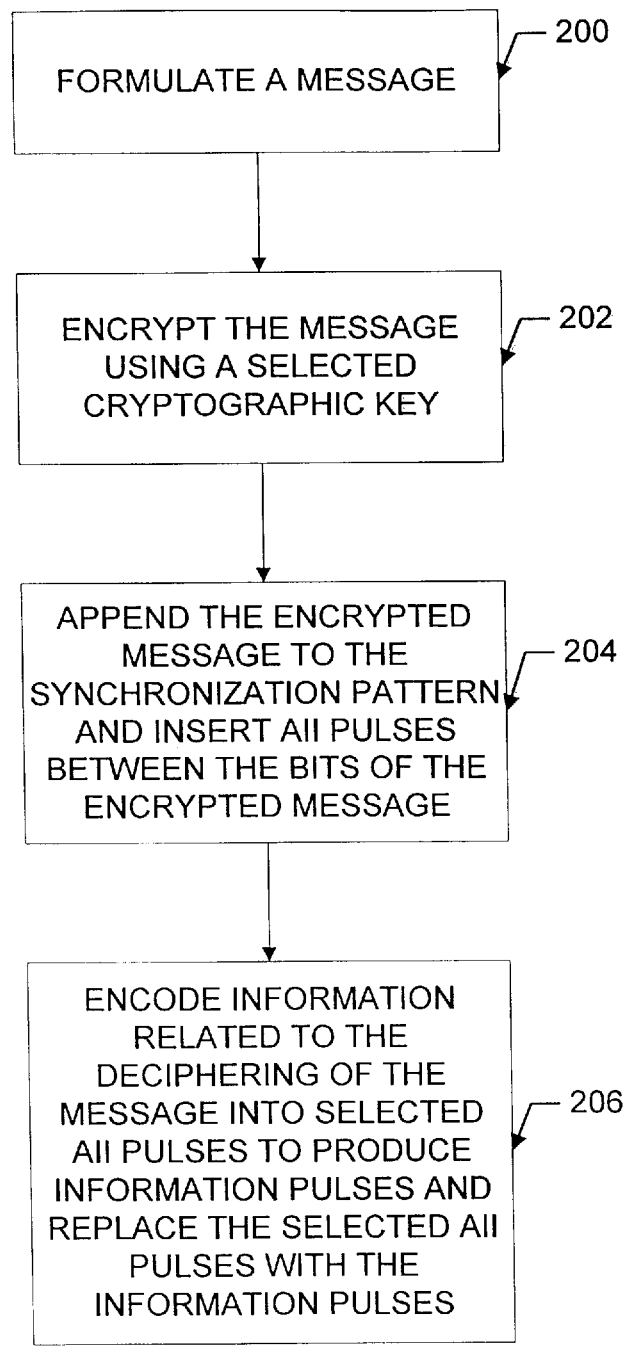
FIG. 2 is a flow chart of the operations of an encryption crypto-computer in the system of FIG. 1.
Figure 3:
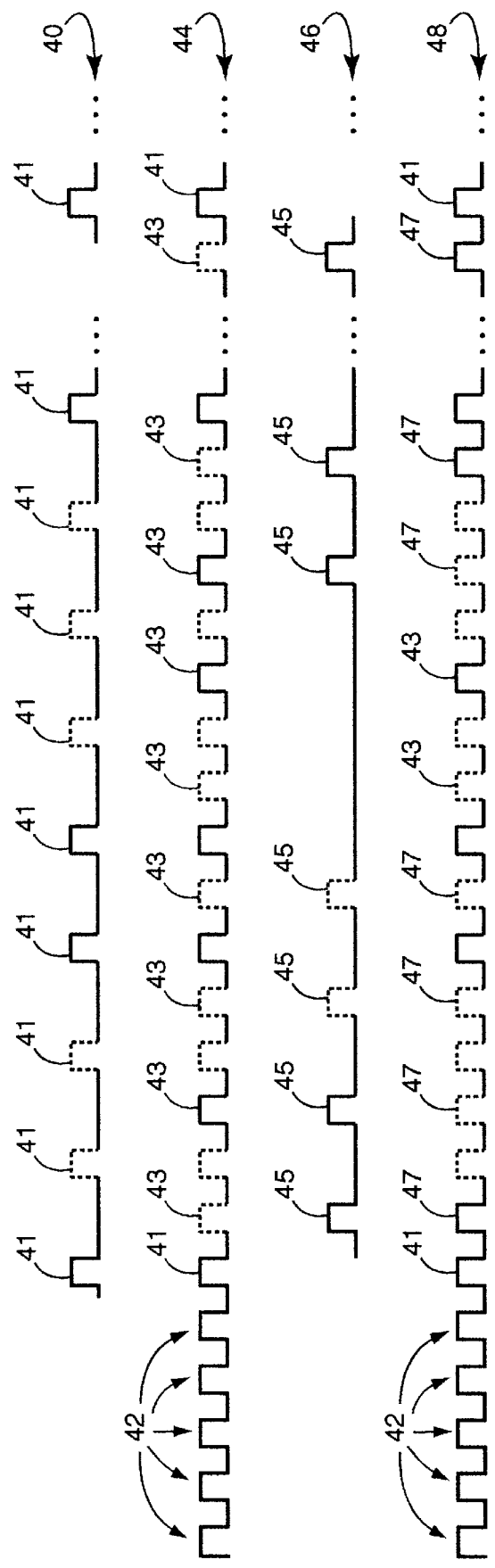
FIG. 3 is a diagram of the waveforms produced at various times by the system of FIG. 1.

Referring now also to FIGS. 2 and 3, the encryption crypto-computer 14 in the interrogation station 12 formulates a 32-bit message using a stored authentication code and a random number that is produced by a random number generator 36 (step 200). This message is then encrypted by encryptor 30 using a cryptographic key selected from the key table 32 (step 202). The encrypted message is depicted in FIG. 3 as waveform 40, with bits 41 that are ones represented as solid-lined pulses and bits that are zeros represented as dotted-line pulses. Next, the encrypter appends the encryptor message to a series of five pulses 42, which are the four synchronization pulses and the ISLS pulse, and inserts the AII pulses 43 between the encrypted bits of the message (step 204). The AII pulses that are between two zeros in the encrypted message are ones and all of the other AII pulses are zeros. The encryption crypto-computer thus forms a preliminary challenge, which is depicted in FIG. 3 as waveform 44.

The encryption crypto-computer 14 next, in encoder 34 encodes into the AII pulses in the preliminary challenge information that relates to, for example, the selection of the cryptographic key (step 206). To do this it replaces selected AII pulses with information pulses, as discussed below. The result of the encoding is a challenge that includes the 4 synchronization pulses, the ISLS pulse, the 32-bit encrypted message the information pulses and any AII pulses that have not been replaced. Since this binary waveform has the same number of bits and pulses as the challenge produced by the prior system, the interrogator 16 modulates and broadcasts the challenge in the same way it did in the prior system.

A typical information waveform, with "N" information bits 45, where $1 \leq N \leq 32$, is indicated in FIG. 3 by the numeral 46. The encoder 34 exclusive-ORs, or otherwise combines, the N information bits with N selected AII pulses to produce N information pulses, which replace the N selected AII pulses in the challenge. In the example depicted graphically in FIG. 3, the information bits are exclusive-OR'd with the selected AII pulses to produce the information pulses 47. The challenge that includes these information pulses is indicated in FIG. 3 by the numeral 48. The information pulses that correspond to information bits that are zeros are thus the same as the AII pulses they replace, and the information pulses that correspond to information bits that are ones differ from the AII pulses they replace.

The selection of the AII pulses to combine with the information bits may be fixed or it may be variable, and based on a cryptographic algorithm that is used by the encoder 34. Preferably, the encryption crypto-computer leaves in the challenge some number of AII pulses, so that these pulses can perform their intended function as deterrents to jamming.

The encryption crypto-computer 14 may include in the information bits, instead of or in addition to the key table address, the time at which the message was encrypted, as indicated by a clock 38. It may also protect the information using an error correction code, and include in the information pulses one or more redundancy bits.

Figure 4:
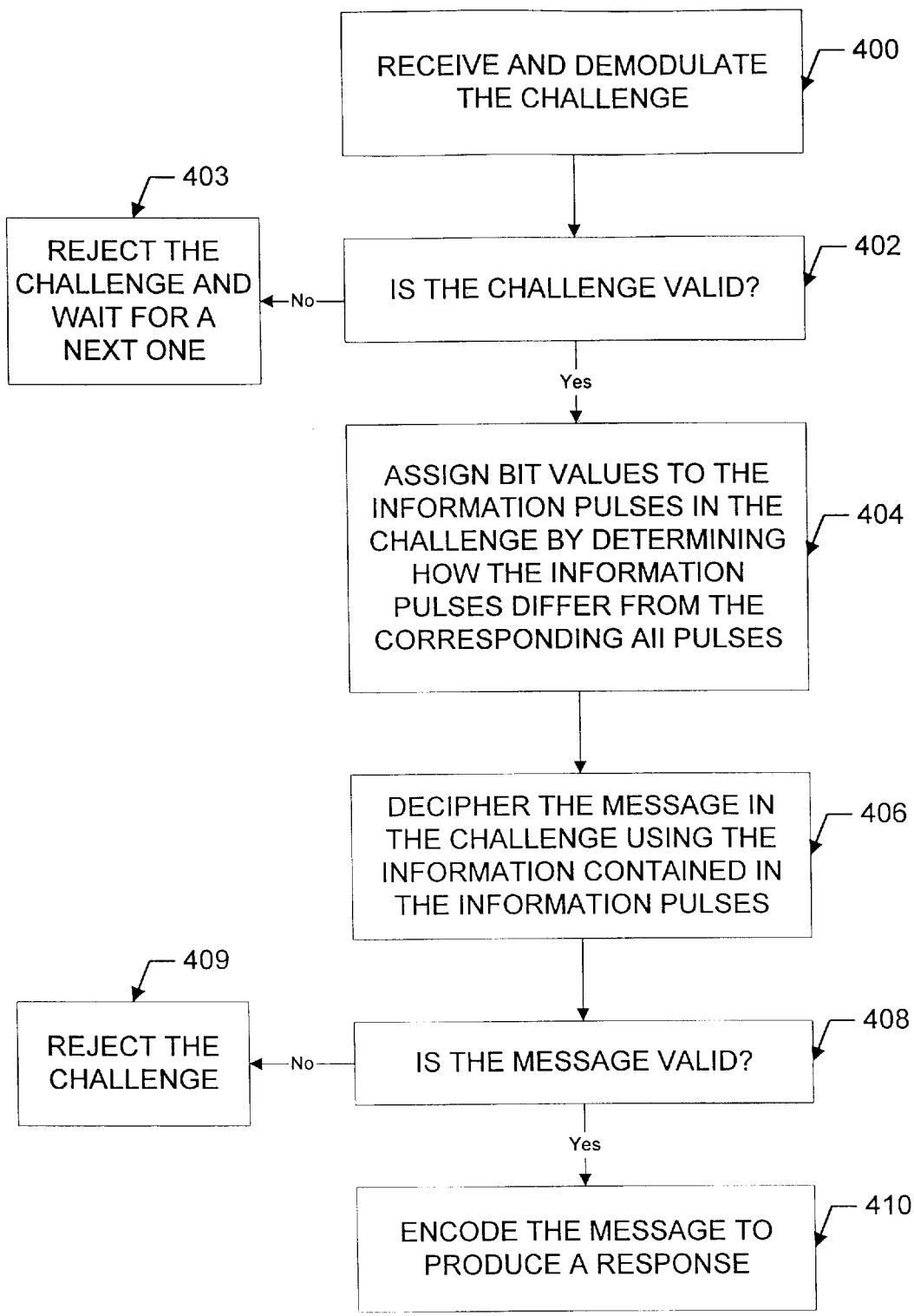
FIG. 4 is a flow chart of the operations of decryption crypto-computer in the system of FIG. 1.

Referring FIGS. 1 and 4, the transponder 22 in the aircraft receives the challenge and demodulates it into a binary waveform that includes the synchronization pulses, the 32-bit encrypted message the information pulses and the any AII pulses that have not been replaced (step 400). Since the transponder 22 does not respond to the content of the binary waveform, it does not alter its receiving and demodulation operations from those used in the prior system because of the inclusion of the information pulses in place of the selected AII pulses. The decryption computer then determines, in its usual manner, if the challenge has at least one pulse within a predetermined number of clock cycles, and is thus a valid challenge (step 402). If the challenge is not valid, that is, if one or more pulses have not occurred within a predetermined number of clock cycles, the decryption crypto-computer rejects the challenge and waits for a next series of synchronization pulses (step 403).

Assuming the challenge is valid, the decryption crypto-computer 24 uses the information that is encoded into the information pulses to, as appropriate, determine which key to use to decipher the 32-bit message. An information-pulse decoder 50 first assigns bit values to the information pulses by determining how these pulses differ from the AII pulses that they replaced (step 504). The decoder 50 thus determines, based on the states of the data pulses, the states in which these replaced AII pulses should have been set. It then assigns ones to the information pulses that differ from the corresponding AII pulses and zeros to the information pulses that are the same as the corresponding AII pulses, or vice versa as appropriate. If the positions of the information pulses in the challenge are variable, the decoder uses the appropriate algorithm to determine the positions of the information pulses and then compares these pulses to the AII pulses that they replaced.

Next, the decryption crypto-computer uses the information bits in the designated manner to decipher the message (step 406). If, for example, the information bits specify the address of the location in the key table 52 that contains the selected key, the decryption crypto-computer uses the information to enter the table. It then disregards the AII and information pulses and deciphers the message in the decrypter 54, using the selected key. The decrypter 54 next compares the authentication code included in the deciphered message with an authentication code stored in the computer and if the two authentication codes match, it sends the deciphered message to an encoder 56, which formulates a response by encoding the deciphered message in a predetermined manner, for example, as a hash (steps 408, 410). The results of the encoding are then transmitted back to the station 12. If the decryption crypto-computer 24 determines that the message in the challenge is not a valid message, i.e., that the authentication codes do not match, the computer rejects the challenge, and refrains from preparing a response (step 409).

The information included in the AII pulses may be the key table address, as discussed above, or it may be information that is encoded in a known manner to produce the table address and/or to select a particular cryptographic key table if the computer contains more than one of these tables. Alternatively or in addition, the information may indicate the time at which the message was encrypted. If the time indication is included, it may be used by the decryption crypto-computer to update its clock 58, or simply to reject messages which are re-plays of prior challenges.

The time indication may also be used in whole or in part to select the key. For example, the system may automatically substitute keys in the order in which they are stored in the key table or in some other predetermined order at various designated times, or it may select the keys from different tables based on the time. The decryption crypto-computer is, in any event, assured of using the correct time-designated key to decipher the challenge, even if the clock 58 in the decryption crypto-computer differs from the clock 38 in the encryption crypto-computer, since the designation of the relevant time is included in the challenge.

As discussed above, the information may be protected by an error correction code and the redundancy bits included in the challenge in one or more of the information pulses. The decoder 50 thus uses the error correction code to correct errors in the decoded information bits before using the bits to address the cryptographic key table 52 or update the clock 58, as appropriate.

The ability of the system 10 to exchange keys automatically based on designated times, with the decryption crypto-computer clock being updated by the unencrypted information contained in the information pulses, avoids the key-switching problems in the prior system created by operator error and/or clock error. Further, the ability of the system 10 to use the unencrypted information contained in the information pulses to select from any number of keys and/or to select the keys at any desired frequency, up to selecting a different key for each challenge, provides a significant improvement in the security of the IFF system over the prior system. And, this improved security is achieved without requiring a re-design of either or both of the interrogators or the transponders.

Figure 5:
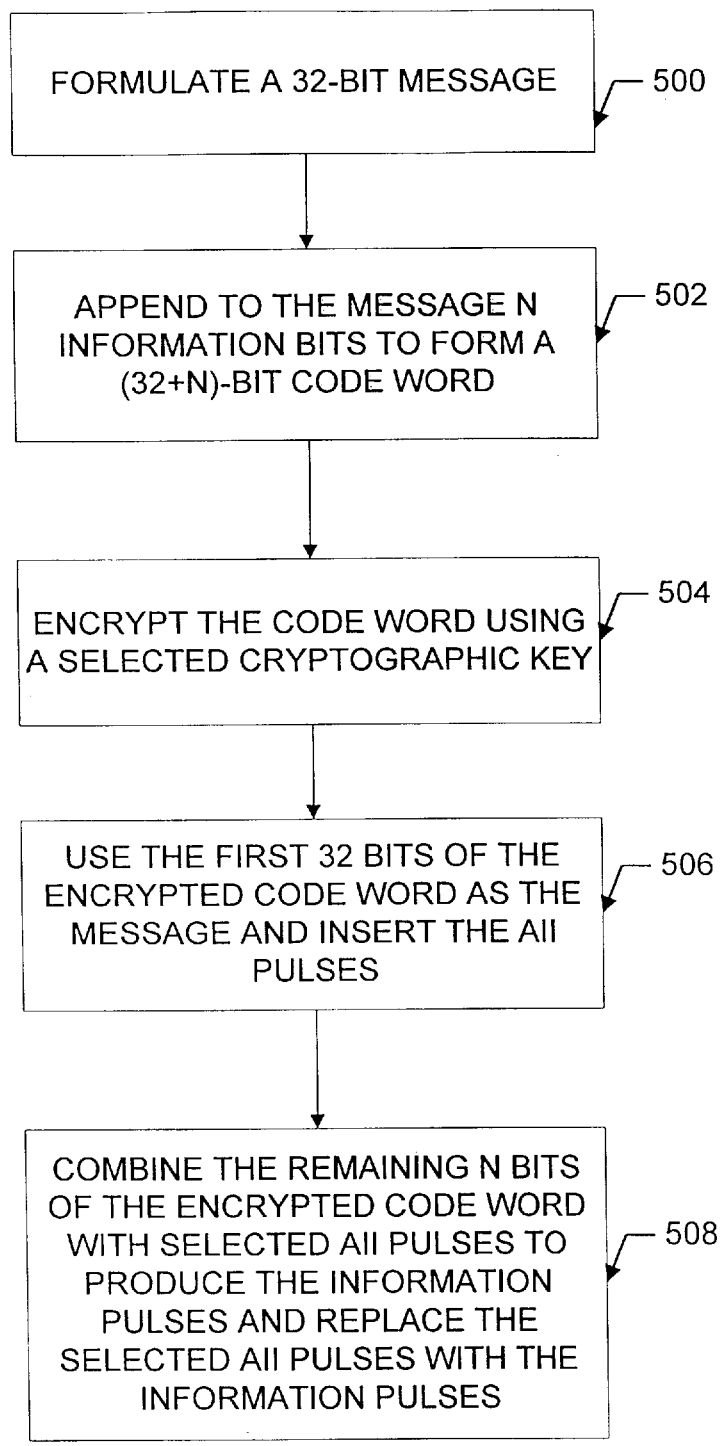
FIG. 5 is a flow chart of further operations of the encryption crypto-computer of FIG. 1.

Referring now to FIGS. 1 and 5, the encryption crypto-computer 14 may instead use the information bits to extend the code length, rather than to designate the cryptographic key. The encryption crypto-computer thus appends the N information bits to the 32-bit message and then in encrypter 30 encrypts the 32+N bits, to produce a (32+N)-bit encrypted code word (steps 500, 502, 504). It uses the first 32 bits of the encrypted code word as the message bits of the preliminary challenge and inserts the AII pulses in the conventional manner (step 506). It next in encoder 34 combines the remaining N code word bits with N selected AII pulses in the preliminary challenge and replaces the N AII pulses with N information pulses (step 508). This produces a challenge that has the requisite number of bits and pulses. The interrogator then broadcasts the challenge in the conventional manner, as a series of radar pulses.

Figure 6:
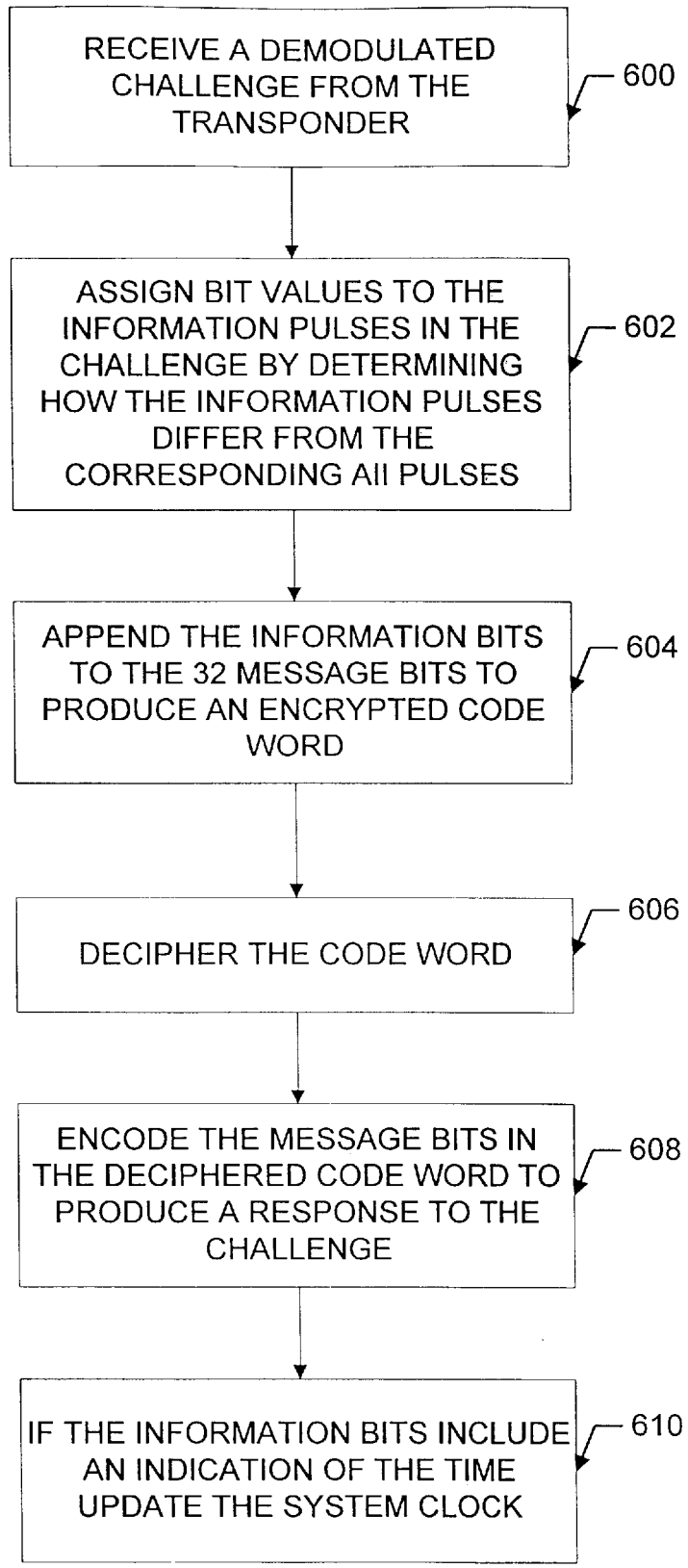
FIG. 6 is a flow chart of the further operations of the decryption crypto-computer of FIG. 1.

Referring to FIGS. 1 and 6, the decryption crypto-computer 24 receives from the transponder 22 a demodulated challenge and decodes information bits from the N information pulses (steps 600, 602). It then uses the information bits and the message bits to from the (32+N)-bit encrypted code word (step 604). It next deciphers the code word, and uses some of the decrypted bits as the message to formulate the response to the challenge (steps 606, 608). The N decrypted information bits may include an indication of the time of encrypting, which the decryption crypto-computer can then use to update its clock (step 610). By using a (32+N)-bit code, even without the more frequent exchange of cryptographic keys discussed above, the system increases its security since it takes essentially $2^N$-times as long to break a (32+N)-bit code as it does to break a 32-bit code. Accordingly, it is unlikely that an enemy can successfully crypto-analyze the longer code during the time interval in which a single key is used, that is, before the interrogation system switches to another key. The system may also exchange the cryptographic keys at designated times, to further enhance the security of the system. Thus, using the longer code alone or coupling it with an exchange of keys thus provides greater security to the IFF system than using the 32-bit code and the two keys of the prior system, and as discussed above with respect to using an automated key exchange, without requiring a re-design of either or both of the interrogators or the transponders.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. An encryption system for producing a binary waveform with a predetermined number of bits, the system including:
    A. means for formulating and encrypting an m-bit message to produce an m-bit encrypted message;
    B. means for inserting between adjacent bits of the m-bit encrypted message an anti-interference pulse that represents a one if the adjacent bits are two zero-valued bits and represents a zero if the adjacent bits are other than two zero-valued bits;
    C. means for replacing one or more selected anti-interference pulses with a corresponding number of information pulses, the information pulses including information that is used to decipher the encrypted message.

2. The encryption system of claim 1 wherein the means for replacing the one or more selected anti-interference pulses produces an information pulse associated with a given selected anti-interference pulse by combining the anti-interference pulse with an information bit.

3. The encryption system of claim 2 wherein the means for replacing the anti-interference pulses produces an information pulse that has the same state as the selected anti-interference pulse if the associated information bit is a zero, and produces an information pulse that has a different state than the selected anti-interference pulse if the associated information bit is a one.

4. The encryption system of claim 2 wherein the means for replacing the anti-interference pulses produces an information pulse that has the same state as the selected anti-interference pulse if the associated information bit is a one, and produces an information pulse that has a different state than the selected anti-interference pulse if the associated information bit is a zero.

5. The encryption system of claim 1 wherein the means for replacing the anti-interference pulses produces the information pulses by combining with the anti-interference pulses information that designates a cryptographic key for use in deciphering the encrypted message.

6. The encryption system of claim 5 wherein the means for replacing the anti-interference pulses further combines with the anti-interference pulses information that designates the time at which the message was encrypted.

7. The encryption system of claim 1 wherein the means for replacing the anti-interference pulses produces the information pulses by combining with the anti-interference pulses information that indicates the time at which the message was encrypted.

8. The encryption system of claim 1 further including:
    D. a decoder for decoding the information pulses to determine the information contained therein; and
    E. decrypting means for using the information in a predetermined manner to decipher the encrypted message and reproduce the multiple-bit message.

9. The encryption system of claim 8 wherein the decoder determines the state of each information pulse and determines that the corresponding information bit used to produce the information pulse is a one if the information pulse does not match the state of the anti-interference pulse that the information pulse replaced, and determines that the information bit is a zero if the information pulse matches the state of the anti-interference that the information pulse replaced.

10. The encryption system of claim 8 wherein the decrypting means uses the information contained in the information bits that correspond to the information pulses to determine the particular cryptographic key to use to decode the encrypted message.

11. The encryption system of claim 10 wherein the decrypting means uses the information contained in the information bits that correspond to the information pulses to address a look-up table that contains a plurality of cryptographic keys.

12. The encryption system of claim 1 further including means for concatenating the encrypted message with a predetermined synchronization pattern, wherein the number of bits in the synchronization pattern is included in the predetermined number of bits in the binary waveform.

13. An encryption system for producing a binary waveform with a predetermined number of bits, the system including:
    A. means for appending n information remaining bits to an m-bit message to form an (m+n)-bit code word;
    B. means for encrypting the code word to produce an (m+n)-bit encrypted code word;
    C. means for selecting m bits of the encrypted code word and inserting between adjacent bits of the m selected bits an anti-interference pulse that is a one if the adjacent bits are two zero-valued bits and an anti-interference pulse that is a zero if the adjacent bits are other than two zero-valued bits; and
    D. means for replacing n selected anti-interference pulses with n information pulses, which n information pulses include the n remaining bits of the encrypted code word that are not the m selected bits.

14. The encryption system of claim 13 further including means for including in the information bits the time that the code word was encrypted.

15. The encryption system of claim 14 further including:
    E. a decoder for decoding the n information bits from the information pulses;
    F. decrypting means for deciphering the (m+n)-bit encrypted code word, the decrypting means using the m selected bits and the n information bits as the (m+n)-bit encrypted code word; and
    G. means for using the information bits to update a system clock.

16. The encryption system of claim 13 further including:
    E. a decoder for decoding the n information bits from the information pulses; and F. decrypting means for deciphering the (m+n)-bit encrypted code word, the decrypting means using the m selected bits and the n information bits as the (m+n)-bit encrypted code word.

17. An identification friend or foe system for producing as a binary waveform a challenge with a predetermined number of bits, the system including:

A. means for formulating and encrypting an m-bit message to produce an m-bit encrypted message;

B. means for inserting between adjacent bits of the m-bit encrypted message an anti-interference pulse that represents a one if the adjacent bits are two zero-valued bits and represents a zero if the adjacent bits are other than two zero-valued bits; and C. means for replacing one or more selected anti-interference pulses with a corresponding number of information pulses, the information pulses including information that is used to decipher the encrypted message.

18. The identification friend or foe system of claim 17 wherein the system further includes means for concatenating with the encrypted message a predetermined synchronization pattern, the pattern being included in the predetermined number of bits.

19. A method of producing a challenge with a predetermined number of bits, the method including the steps of:

A. encrypting an m-bit message in accordance with a selected cryptographic key to produce an m-bit encrypted message;

B. inserting between adjacent bits of the m-bit encrypted message an anti-interference pulse that represents a one if the adjacent bits are two zero-valued bits and represents a zero if the adjacent bits are other than two zero-valued bits; and C. replacing one or more selected anti-interference pulses with a corresponding number of information pulses, the information pulses including information that relates to the decrypting the message.

20. The method of claim 19, wherein the step of replacing the selected anti-interference bits includes producing an information pulse associated with a selected one of the anti-interference pulses by combining the selected anti-interference pulse with an information bit.

21. The method of claim 20, wherein the information bits designate the cryptographic key that is to be used to decipher the encrypted message.

22. The method of claim 20, wherein the information bits further include an indication of the time that the message was encrypted.

23. The method of claim 19, wherein the information bits include an indication of the time that the message was encrypted.

24. The method of claim 19, further including the steps of:

D. interpreting the information pulses to determine the information contained therein; and E. using the information in a predetermined manner to decipher the encrypted message and reproduce the m-bit message.

25. The method of claim 24 wherein the step of interpreting the information pulses includes determining the state of each information pulse and determining that the corresponding information bit used to produce the information pulse is a one if the information pulse does not match the expected state of the anti-interference pulse that the information pulse replaced, and determining that the information bit is a zero if the information pulse matches the state of the anti-interference pulse that the information pulse replaced.

26. The method of claim 25 wherein the step of using the information contained in the information pulses includes using the information to determine which cryptographic key to use to decipher the encrypted message.

27. The method of claim 25 wherein the step of using the information contained in the information pulses includes using the information to address a look-up table that contains a plurality of cryptographic keys.

28. A method of producing a challenge with a predetermined number of bits, the method including the steps of:

A. appending n information bits to an m-bit message to form an (m+n)-bit code word;

B. encrypting the code word to produce an (m+n)-bit encrypted code word;

C. selecting m bits of the encrypted code word and inserting between adjacent bits an anti-interference pulse that is a one if the adjacent bits are two zero-valued bits and an anti-interference pulse that is a zero if the adjacent bits are other than two zero-valued bits; and D. replacing n selected anti-interference pulses with n information pulses, which n information pulses include the n remaining bits of the encrypted code word that are not the m selected bits.

29. The method of claim 28 further including the steps:

E. decoding the n information bits from the n information pulses; and

F. deciphering an (m+n)-bit encrypted code word that includes the n information bits.

* * * * *